United States Patent [19]

Ruark

[11] 4,234,164
[45] Nov. 18, 1980

[54] LINE HAULER FOR CRAB POTS AND THE LIKE

[76] Inventor: Joseph S. Ruark, Rte. 3, Box 233, Cambridge, Md. 21613

[21] Appl. No.: 928,908

[22] Filed: Jul. 28, 1978

[51] Int. Cl.³ .............................................. A01K 73/06
[52] U.S. Cl. ........................................ 254/371; 43/8
[58] Field of Search ................... 254/138, 137, 139.1, 254/191, 175.5, 175.7; 114/218; 226/181, 183; 43/8; 74/230.24, 230.17 B, 230.17 A, 230.5, 230.7; 180/1 R

[56] References Cited

U.S. PATENT DOCUMENTS

| | | | |
|---|---|---|---|
| 948,516 | 2/1910 | Mold | 74/230.24 |
| 1,122,933 | 12/1914 | Hufford | 74/230.24 |
| 1,683,922 | 9/1928 | Rusk | 254/138 |
| 1,915,501 | 6/1933 | Lobbe | 74/230.24 |
| 2,245,456 | 6/1941 | Bowser, Jr. | 74/230.05 |
| 3,034,767 | 5/1962 | Gordon | 254/139.1 |
| 3,118,418 | 1/1964 | Faul | 114/218 |

FOREIGN PATENT DOCUMENTS 2343625  3/1976  France ................. 180/1 R

Primary Examiner—Robert J. Spar
Assistant Examiner—Kenneth Noland
Attorney, Agent, or Firm—Laurence R. Brown

[57] ABSTRACT

A long life crab pot hauling system is provided with longer life than before available in a harsh salt water marine environment and with operation from an energy saving low power gasoline motor capable of dislodging a crab pot from the bottom of a body of water and hauling it up into a vessel without stalling. This is accomplished by a line hauler sheave having a heavy flywheel effect provided by a pair of separated flywheels of cast iron or the like between which is affixed respectively to each flywheel a pair of replaceable sheave members of a salt water and wear resistant material such as stainless steel forming an inclined groove for frictionally receiving the hauling line therebetween with said flywheel-sheave assembly being driven by the low power gasoline motor that can be readily carried on a small boat or skiff that services a line of crab pots. Only the sheave members are replaced after wear or corrosion caused by the lines.

9 Claims, 2 Drawing Figures

LINE HAULER FOR CRAB POTS AND THE LIKE

The present invention relates to a device for hauling crab pots or the like in a marine environment, and more particularly to a sheave of the device.

Crab pots are placed at the bottom of bodies of water such as bays to trap and catch crabs, lobsters, or the like. It is necessary to periodically haul such crab pots or traps aboard a vessel for the purpose of unloading the pots, rebaiting and resetting the same. Such an apparatus is exemplified in U.S. Pat. No. 3,034,767 of Gordon. Gordon shows a sheave or wheel powered by a hydraulic motor for hauling a line connected to such a crab pot. One of the problems with such devices is that the line engaging surfaces of the sheave suffer substantial wear and, in some such devices, in order to reduce the cost of materials when the sheave is replaced, the sheave is made of cast iron which corrodes very rapidly in the marine environment. The abrasive wear results from a line wetted with salt water being grippingly wedged into the groove of the sheave and then being stripped from the groove after the line is carried for a distance about the sheave. A stripper strips the line from the groove and permits the line to play out past the sheave. This wear and salt water corrosion causes a maintenance expense to be regularly incurred by having to replace the sheaves. The sheave replacement requires disassembly of the hauler and further requires the purchase of replacement sheaves which wastes considerable material inasmuch as the sheave also is a flywheel having substantial mass as will be discussed hereinafter.

Driving power is supplied to the inner half or inner plate of the sheave. The outer plate is usually secured to the inner plate and rotates therewith. Even when a shim is used to space the distance between the plates of the sheave to adjust for wear on the plates, the selection of such a shim requires a time consuming trial and error approach. Moreover, even if the outer plate is designed to be replaceable, i.e. ease of securement and cheaper and softer material, the replacement outer plate will still result in a considerable materials expenditure because of the required flywheel effect. In any event, the inner plate which can be harder and heavier continues to be worn and will have to be replaced with the attendant inconvenience of a substantial tear down, downtime and waste of material.

Even if the sheaves are made of non-corrodible materials with good wear characteristics such as bronze or stainless steel, the sheaves are subjected to surface contamination caused by the salt water adhering to the rope as well as wave splash, and such contaminants have a further abrasive effect when subjected to the action of the line.

Thus, in addition to a requirement that the sheave be made of relatively expensive material such as bronze or stainless steel to resist wear and corrosion, the cost of the sheave is further increased because the sheave must have sufficient mass to act as a flywheel. The motor driving such devices is usually a hydraulic motor or small horsepower gasoline motor which is substantially underpowered and the sheave is designed to exhibit a substantial moment of inertia so that when the line is tautly engaged, the inertia of the sheave will overcome the inertia of the crab pot and the motor will not stall. Accordingly, the sheave must have substantial mass and the replacement of the sheave requires discarding a substantial amount of material with the attendant expenditure for such materials.

It is to this repair and maintenance problem of sheaves for crab pot haulers or the like that the present invention is directed.

Prior art inserts for sheaves, such as exemplified in U.S. Pat. No. 3,946,618 of Green, or in German Pat. No. 367,654 of Haupt are unable to satisfactorily overcome this maintenance problem in a marine environment. Green teaches that the rim is provided with a series of groove defining segments of resilient material. Such segments would be insufficient to withstand the abrasive forces present in crab pot haulers. The Haupt patent shows a movable member the position of which is shiftable by the forces exerted by the line with the amount of movement of the movable member being limited by guide pins. The Haupt movable members are not well suited for a marine environment, especially when corrosion and contaminants inhibit such movement and eventually can freeze the member in place causing the sheave to exhibit an unsatisfactory wobble and unbalanced condition.

Accordingly, it is an object of the present invention to provide a device which overcomes the problems stated above.

Another object of the present invention is to provide a device for hauling crab pots wherein the life of the sheave is substantially increased.

A further object of the present invention is to provide a device for hauling crab pots wherein a pair of inserts are included within the groove of the sheave, said inserts protecting the line engageable surfaces of the sheave from abrasion caused by the line.

Still another object of the present invention is to provide a device for hauling crab pots wherein inserts substantially reduce the expense and effort in maintaining and repairing such a sheave.

A further object of the present invention is to provide inserts for a device for hauling crab pots wherein the inserts are easily replaceable and have substantially less mass than the sheave.

Further objects and advantages of the present invention will become apparent as the following description proceeds and the features of novelty characterizing the invention will be pointed out with particularity in the claims annexed to and forming a part of this specification.

Briefly, the present invention relates to a device for hauling crab pots. A sheave is rotatably mounted to a base and drivable by a motor. The sheave is formed in two halves or plates forming a first groove with each plate having an inner surface. A pair of inserts are disposed within the first groove and are secured to the sheave, and are constrained to rotate therewith. The inserts form a second groove within which a line is wedgingly engageable for being pulled along its length. The inserts are each interposable between the line and the inner surface of the respective one of the plates so that the inserts, instead of the inner surface of the plates, are abraded by the frictional action of the line. Additionally, the inserts protect the inner surface from corrosion and contamination caused by water adhering to the wetted line and are replaceable and have a mass substantially less than the mass of sheave.

For a better understanding of the present invention reference may be had to the accompanying drawings wherein the same reference numerals have been applied to like parts and wherein.

Figure 1:
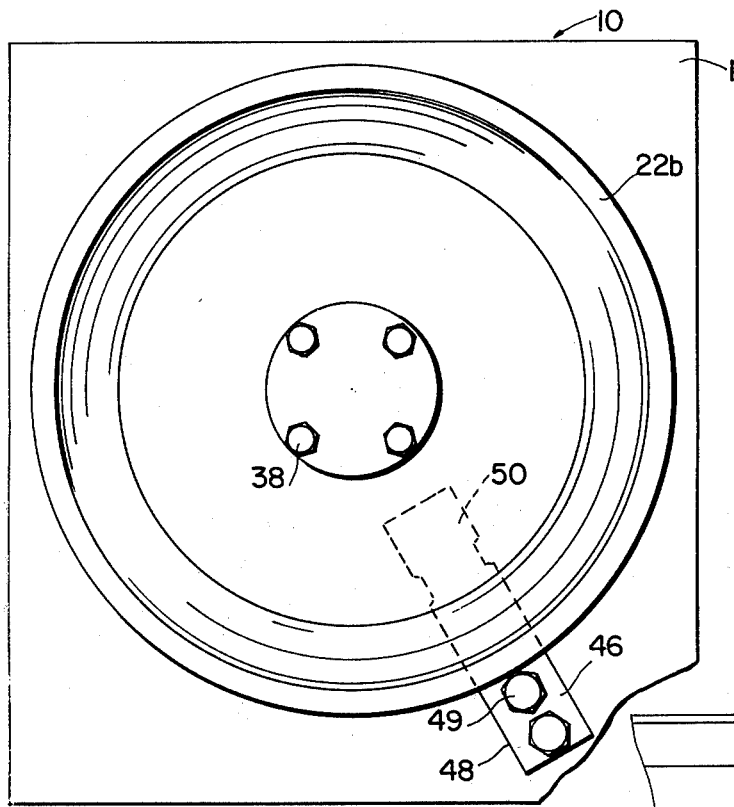
FIG. 1 is a front elevational view of the exemplary embodiment of the present invention.
Figure 3:
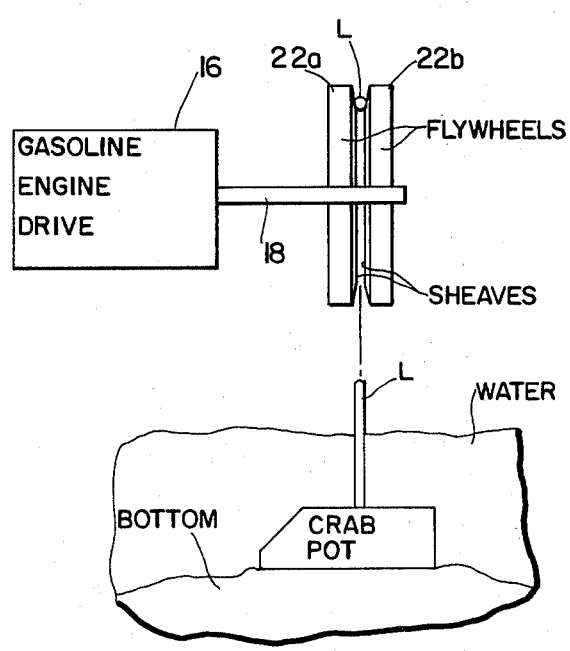
FIG. 3 is a schematic drawing of the system including the present invention.
Figure 2:
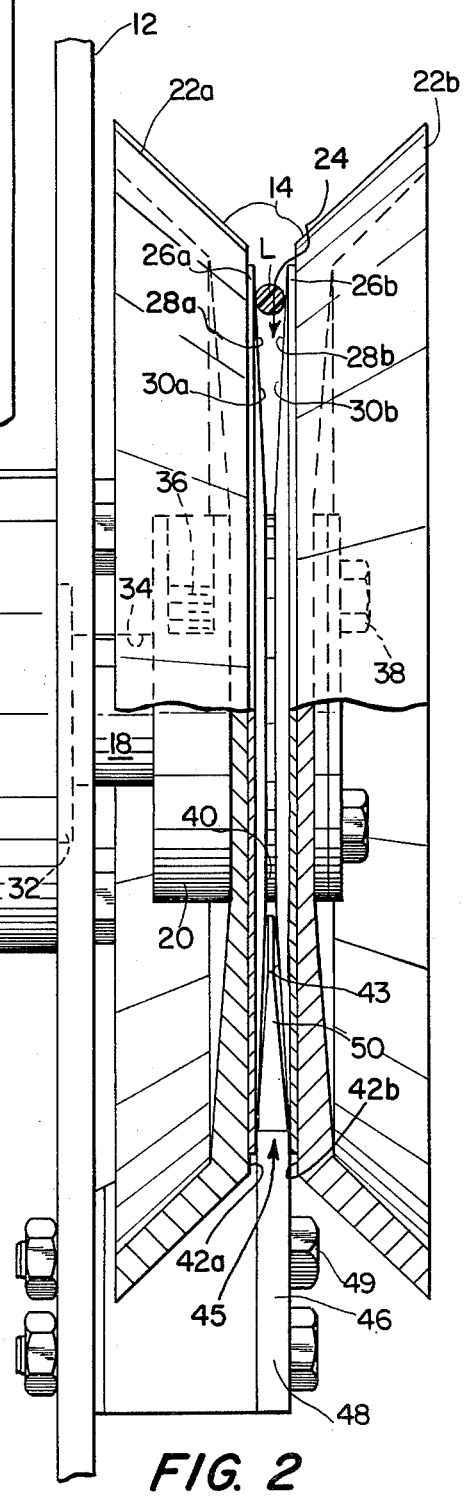
FIG. 2 is a side elevational view of FIG. 1 with a portion cut-away.

Referring now to the drawings, there is shown a device for hauling crab pots, generally designated 10, having a frame or base 12 rotatably supporting a sheave 14. A motor 16 is supported on the base 12 and is provided with a shaft 18 connected to a hub 20 of the sheave 14 for rotatably driving the sheave. The sheave 14 is formed in two halves, each half comprising a plate 22a, b with the plates 22a, b forming a groove 24. Sheave members or inserts 26a, b are secured to the respective plates 22a, b at the hub 20 and are constrained to rotate therewith. Inner surfaces 28a, b of the respective inserts 26a, b form sides of the groove at 30a and 30b and are adapted to wedgingly grab a line L connected to a crab pot or the like for hauling said crab pot into a vessel for unloading, rebaiting and resetting the same.

More particularly, the base 12 supports the motor 16 and is adapted to be secured or supported by an external member. The motor 16 can be any motor suitable for the purpose, the motor of the present embodiment being a low horsepower gasoline powered motor. The motor casing can include gears to reduce the rpm of the motor and proportionately increase the torque at the shaft 18. The shaft 18 extends outwardly of the motor and is supported by a bearing 32. The shaft 18 extends outwardly through the base 12 and provides a cantilever support for the open face sheave 14.

The hub 20 is provided with an aperture 34 and is matingly fitted over the shaft 18 and secured thereto by a set screw 36. The hub 20 is provided with appropriate threaded apertures within which are received threaded bolts 38 which pass through appropriate apertures in the plates 22a, b and the inserts or sheave members 26a, b and secure the plates and the inserts to the hub 20.

Inner surfaces 42a, b of the respective plates 22a, b and the inner surfaces 28a, b of the respective inserts 26a, b are shaped to form V-shaped grooves 24, and are adapted to wedgingly engage the line from the crab pots. The grooves 24 include a narrow portion 43 disposed proximal the hub 20 with the surfaces 42a, b and 28a, b converging at a small acute angle, usually two to five degrees. A relatively wide entrance portion 45 is designed to freely permit the line L to enter and to accommodate any knots in the line. Once a portion of the line L has entered portion 45, as a result of the load forces acting on the line and the drive force applied by the sheave 14 and the motor 16 in hauling the line, the line L becomes wedged tightly in the groove 24 and the inserts 26a, b are compressed against in an abuttingly engaging manner and supported by the inner surfaces 42a, b in a direction parallel to the axis of rotation of the sheave 14. Such a wedging action serves to increase the friction to haul the line without appreciable slippage. Since the diameter of the lines used in commercial crab fishing and similar fields vary in diameter, the entrance width of the entrance portions 44, 45 are subject to variation by changing the thickness of a shim 40 which is interposed between the inserts 26a, b in order to establish the desired spacing between them.

A line separator or stripper 46 is secured to the base 12 and comprises a shank portion 48 which is secured by threaded bolts or screws 49 to the base 12 and includes a tapered portion 50 which projects inwardly into the groove 45 and is suitably rounded and shaped so that as the portion of the line approaches the separator 46, the line L will be stripped from the groove 45 without chafing or wear despite its highly compressed condition as it travels around the running bight engaged in the sheave 14.

The sheave 14 is provided with considerable mass and moment of inertia as the motor 16, for devices of this kind, is usually underpowered. When the sheave 14 and the inserts 26a, b engage the line, a flywheel action due to the sheave 14 is necessary to overcome the inertia of the crab pot when the line becomes taut. Compared to the sheave 14, the inserts 26a, b are light in weight and are not configured to have a large moment of inertia, and accordingly, have very little flywheel effect. The mass and moment of inertia of the sheave 14 should be at least 500% greater than the mass and moment of inertia of the inserts.

Because of the desired flywheel effect, the sheave 14 requires substantial material to provide the necessary mass for the required moment of inertia. Additionally, the inner sheave often provides a portion of the inner drive mechanism thereby requiring a tear down of the device when replacement is required caused by the frictional abrasive wear of the line. In order to reduce the wear on the inner sheave, the inner sheave can be made of wear and corrosion resistant metals such as stainless steel or bronze alloy. However, when replaced, the substantial mass of relatively expensive material must be discarded. To avoid the discarding of expensive materials, some devices are constructed with cast iron sheaves, but such are then subject to substantial corrosion and do not avoid the problem of abrasive wear and of a major tear down of the device when the sheave is replaced. The inserts of the present invention can be made of light weight and inexpensive material because of the ease of replacement and the quantity of discarded metal is small. The inserts can be made of cast iron or of a thermosetting plastic such as phenolic which, to some extent, withstand the abrasion of the line since extreme longevity of the inserts 26a, b is not required. Even though plastic or softer metals such as aluminum would not withstand the abrasion as well as if they were made of expensive harder and non-corrosive metal, the low cost of replacement still make the inserts very economical. The inserts of the present embodiment are made of stamped stainless steel, such as type 304, and present a middle ground between wearability and replacement cost.

The inserts 26a, b of the present embodiment are disc-like and frusto-conical in shape and abuttingly engage the line engageable surfaces 42a, b of the sheave 14. In addition to protecting the surfaces 42a, b from abrasive wear, the inserts 26a, b also protect the surfaces from corrosion and contamination. Since the inserts protect the sheave inner surfaces from such abrasion, corrosion and contamination, the sheave 14 need not be designed to withstand such and a more economical sheave being used. The inserts of the present embodiment were designed to be used on devices which have sheaves originally designed to engage a line in a manner described hereinabove in connection with the inserts 26a, b, without such an insert, however, it is within the contemplation of the present invention that the sheave be designed to work with and require such an insert and accordingly, such a sheave can have a substantially different shape, size and inner surfaces and be made of different materials as long as the provided for insert can perform as described above.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent of the United States is:

1. A crab pot hauling system comprising in combination, a frame, a drive motor, a shaft drivably coupled to the motor and rotatably supported by the frame, a pair of spaced generally cylindrically shaped flywheels affixed on said shaft for rotation therewith to provide significant rotational inertia, a pair of spaced line hauling inclined light weight sheave members having a disc-like shape and made of wear and corrosion resistant material removably affixed respectively to and between said flywheels, each of said sheave members having an outer rim within the circumference of the flywheels and such that each of said sheave members is circular and engages an inner surface of the flywheels over substantially the entire inner surface of the flywheels, each of said sheave members being spaced to receive and grip frictionally a line between an inwardly converging or V-shaped groove therebetween at a position substantially midway from the outer rim of each sheave member to the shaft to impart a hauling tension to the line, mounting means holding the flywheels and sheave members in fixed relative position for common rotation with the shaft extending through the flywheels and sheave members, and line stripper means mounted on said framework extending between the sheave members thereby to engage a line frictionally held between the sheave members and release the line from the friction grip.

2. The device of claim 1 wherein the mass of the flywheels is greater than 500% of the mass of the two sheave members.

3. The device of claim 1 wherein the flywheels present a circular internal surface and are frusto-conical in shape to guide the line into the sheave members, and the sheave members conformably engage substantially the entire respective flywheel inner surfaces.

4. The device of claim 1 wherein the sheave members are removably securable to the sheave by fastening means for quick replacement after significant wear and abrasion.

5. In a device for hauling crab pots and the like from beneath the surface of a body of water where a line is connected to the crab pot, the device being provided with a base, a sheave having heavy side plates with a generally circular inner surface and enough mass to produce significant rotational inertia rotatably mounted to the base for rotating about an axis of rotation, a pair of inserts affixed between said plates to rotate therewith which are adapted to engage wedgably the line and transmit to the line force provided by rotation of the sheave for pulling the line therealong and lifting the crab pot and its contents, the inserts being of a material not corrosive in salt water thereby protecting the line from abrasion caused by the engagement with the line with the sheave inserts, the inserts being replaceably secured to said sheave and each comprising a generally disc-like member having a first and a second side and adapted to be secured to and constrained to rotate with the sheave, the first side of each insert being adapted to abuttingly engage an inner surface of the respective side plate of the sheave over substantially the entire inner side plate surface and to be supported by the inner surface of the side plate in a direction parallel to the axis of rotation, the second side of each insert being provided with a line engageable surface which in cooperation with the line engageable surface of the other insert is adapted to form a V-shaped or inwardly converging groove and engage wedgably a line within the groove for pulling the line therealong, the insert being generally resistant to wear and abrasion caused by the line and having substantially less mass and moment of inertia than the sheave.

6. The device of claim 5 wherein the inserts are made of one of a stainless steel and a plastic.

7. The device of claim 5 wherein the side plates are frusto-conical in shape to guide the line into the spacing between the inserts.

8. The device of claim 5 wherein the mass of the sheave side plates is greater than 500% of the mass of the two inserts.

9. The device of claim 5 wherein the inserts are removably securable in contact with the respective plates for replacement after significant wear and abrasion.

* * * * *